US012296590B2

(12) United States Patent
Mizuno

(10) Patent No.: US 12,296,590 B2
(45) Date of Patent: May 13, 2025

(54) LIQUID DROPLET EJECTION HEAD

(71) Applicant: BROTHER KOGYO KABUSHIKI KAISHA, Nagoya (JP)

(72) Inventor: Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 195 days.

(21) Appl. No.: 18/314,867

(22) Filed: May 10, 2023

(65) Prior Publication Data

US 2024/0326424 A1 Oct. 3, 2024

(30) Foreign Application Priority Data

Mar. 27, 2023 (JP) ................................ 2023-050079

(51) Int. Cl.
*B41J 2/14* (2006.01)

(52) U.S. Cl.
CPC .. *B41J 2/14233* (2013.01); *B41J 2002/14266* (2013.01)

(58) Field of Classification Search
CPC .................... B41J 2/14233; B41J 2002/14266
See application file for complete search history.

(56) References Cited

FOREIGN PATENT DOCUMENTS

JP 2009279865 A * 12/2009

OTHER PUBLICATIONS

Kobayashi Hideyuki et al., "Inkjet Recording Device and Inkjet Recording Method", Dec. 3, 2009, [Abstract, Best Mode: Inkjet ejection apparatus] (Year: 2009).*

* cited by examiner

*Primary Examiner* — Lisa Solomon
(74) *Attorney, Agent, or Firm* — Merchant & Gould P.C.

(57) ABSTRACT

A liquid droplet ejection head includes a channel member and a piezoelectric element. The channel member has a channel. The channel includes a nozzle and a pressure chamber communicating with the nozzle. The piezoelectric element is fixed to the channel member and applies a pressure to liquid in the pressure chamber. The channel has a natural frequency Fr of 200 kHz or more. The nozzle has a diameter D [μm] and a taper angle θ [°] that satisfy $\theta \geq -2.3 \times D + 65$ and $\theta > 1.9 \times D$.

9 Claims, 6 Drawing Sheets

LIQUID DROPLET EJECTION HEAD

REFERENCE TO RELATED APPLICATIONS

This application claims priority from Japanese Patent Application No. 2023-050079 filed on Mar. 27, 2023. The entire content of the priority application is incorporated herein by reference.

BACKGROUND ART

A known inkjet head includes nozzles. Optimal numerical values of taper angle of nozzle and diameter of the nozzle are known in a case where a recording head (liquid droplet ejection head) is driven at a drive frequency of about 25 to 40 KHz.

DESCRIPTION

In order to perform high-speed recording, it is conceivable to increase the driving frequency. One of means for increasing the driving frequency is to increase a natural frequency Fr of a channel.

However, when the natural frequency Fr is high, it is necessary to apply a high drive voltage to a piezoelectric element in order to eject a predetermined amount of liquid droplet from the nozzle depending on a taper angle of the nozzle and a diameter of the nozzle.

When a high drive voltage is applied to the piezoelectric element, the amount of heat generated by the piezoelectric element increases based on Joule's laws. When the heat of the piezoelectric element is transmitted to the liquid in the channel, the viscosity of the liquid decreases. The lower the viscosity of the liquid is, the larger the volume of the droplet ejected from the nozzle is. When the volume of a droplet ejected from the nozzle is large, a density of an image formed by the droplet is high.

An advantage of some aspects of the disclosure is to provide a liquid droplet ejection head capable of lowering a drive voltage applied to the piezoelectric element at a high driving frequency.

According to an aspect of the disclosure, there is provided a liquid droplet ejection head including: a channel member having a channel including a nozzle and a pressure chamber communicating with the nozzle; and a piezoelectric element fixed to the channel member and pressurizing liquid in the pressure chamber, wherein a natural frequency Fr of the channel is 200 kHz or more, and diameter D [μm] of the nozzle and taper angle θ [°] of the nozzle satisfy $\theta \geq -2.3\times D+65$ and $\eta > 1.9\times D$.

In order to drive the liquid droplet ejection head at a high driving frequency desired by the inventor of the present application, the natural frequency Fr is preferably 200 kHz or more. In order to satisfy the requirement that the natural frequency Fr is 200 kHz or more, it is necessary to optimize the diameter D of the nozzle and the taper angle θ of the nozzle, and as a result of analysis described later, it is necessary that the diameter D [μm] of the nozzle and the taper angle θ [°] of the nozzle satisfy $\theta \geq -2.3\times D+65$. Further, when the diameter D [μm] of the nozzle and the taper angle θ [°] of the nozzle satisfy $\theta > 1.9\times D$, the drive voltage applied to the piezoelectric elements can be reduced.

FIRST EMBODIMENT

Figure 1:
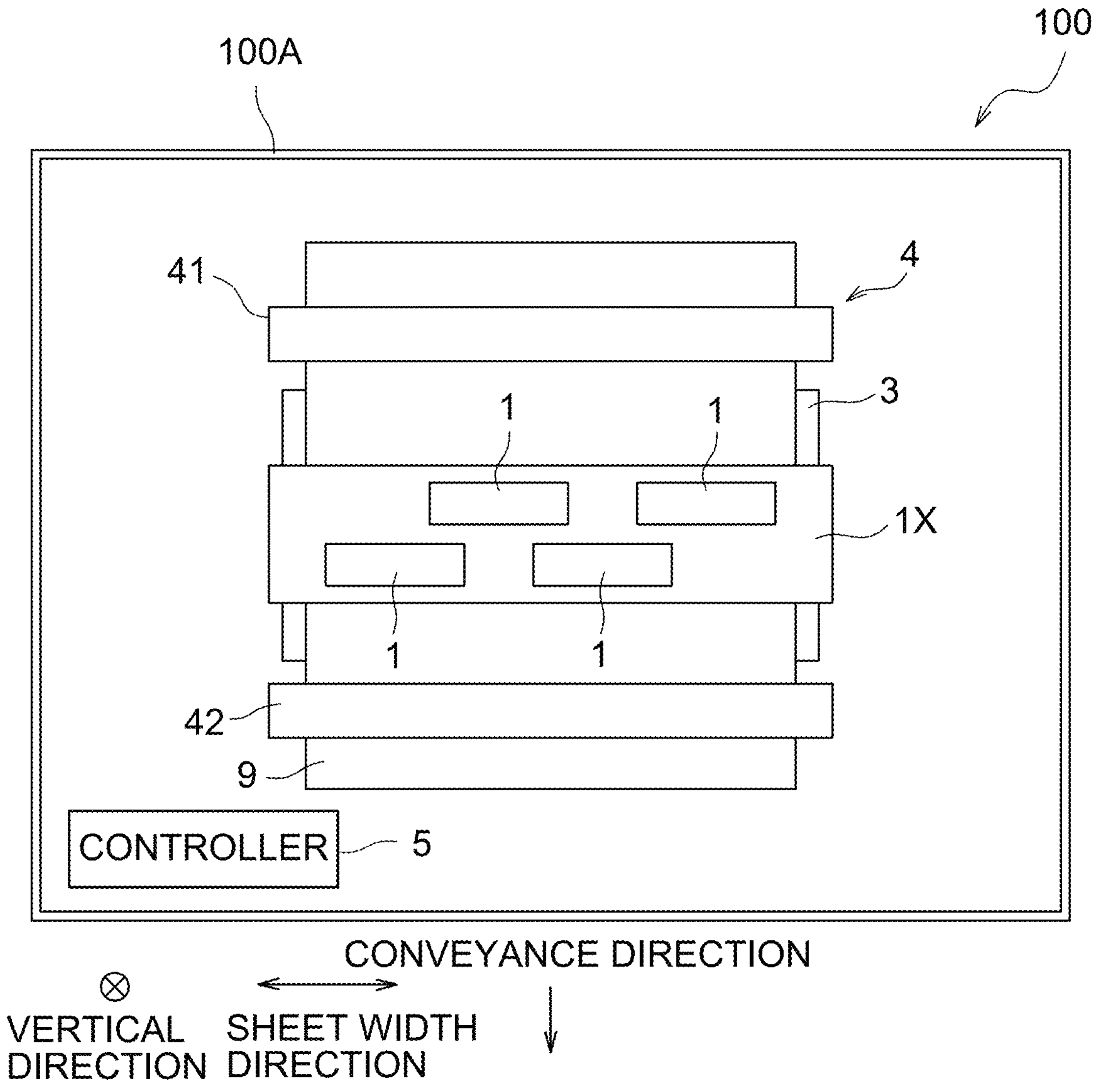
FIG. 1 is a plan view of a printer 100 including a head 1 according to a first embodiment of the present disclosure.

As illustrated in FIG. 1, a printer 100 includes a head 1 according to a first embodiment of the present disclosure. The head 1 is an example of a liquid droplet ejection head.

The printer 100 includes a housing 100A, a head unit 1X, a platen 3, a conveyance mechanism 4, and a controller 5. The head unit 1X, the platen 3, the conveyance mechanism 4, and the controller 5 are disposed in the housing 100A.

The printer 100 further includes a button disposed on the outer surface of the housing 100A.

The head unit 1X is longer in a sheet width direction than in a conveyance direction. The sheet width direction is a direction along the widthwise direction of a sheet 9, and is orthogonal to the vertical direction. The head unit 1X is fixed to the housing 100A. The type of the head unit 1X is a line type.

The head unit 1X includes four heads 1. The four heads 1 are disposed in a staggered manner in the sheet width direction. The heads 1 are longer in the sheet width direction than in the conveyance direction.

The platen 3 is a plate along a plane orthogonal to the vertical direction, and is disposed below the head unit 1X. The sheet 9 is supported on the upper surface of the platen 3.

Figure 2:
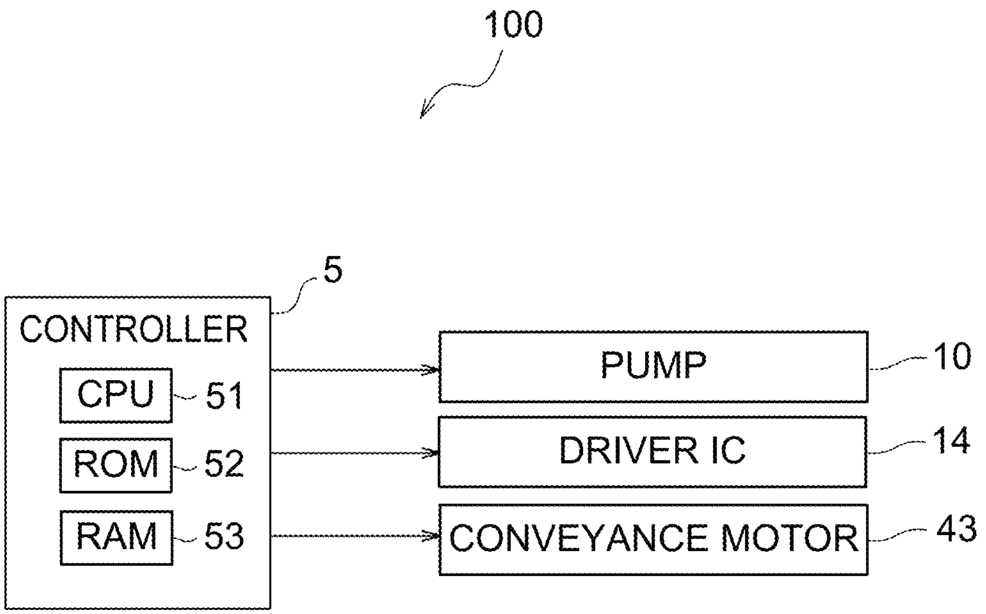
FIG. 2 is a block diagram illustrating an electrical configuration of the printer 100.

The conveyance mechanism 4 includes a roller pair 41 having two rollers, a roller pair 42 having two rollers, and a conveyance motor 43 illustrated in FIG. 2. In the conveyance direction, the head unit 1X and the platen 3 are disposed between the roller pair 41 and the roller pair 42. The conveyance direction is orthogonal to the vertical direction and the sheet width direction.

When the conveyance motor 43 is driven under the control of the controller 5, the rollers of the roller pairs 41 and 42 rotate. When the rollers of the roller pairs 41 and 42 rotate, the sheet 9 nipped by the rollers of the roller pairs 41 and 42 is conveyed in the conveyance direction.

As illustrated in FIG. 2, the controller 5 includes CPU 51, ROM 52, and RAM 53.

CPU 51 executes various kinds of control in accordance with programs and data stored in ROM 52 and RAM 53 based on data inputted from an external device or by pressing the button. The external device is, for example, a personal computer (PC).

ROM 52 stores programs and data for CPU 51 to perform various kinds of control. RAM 53 temporarily stores information used when CPU 51 executes the program.

Next, a configuration of the head 1 will be described.

Figure 4:
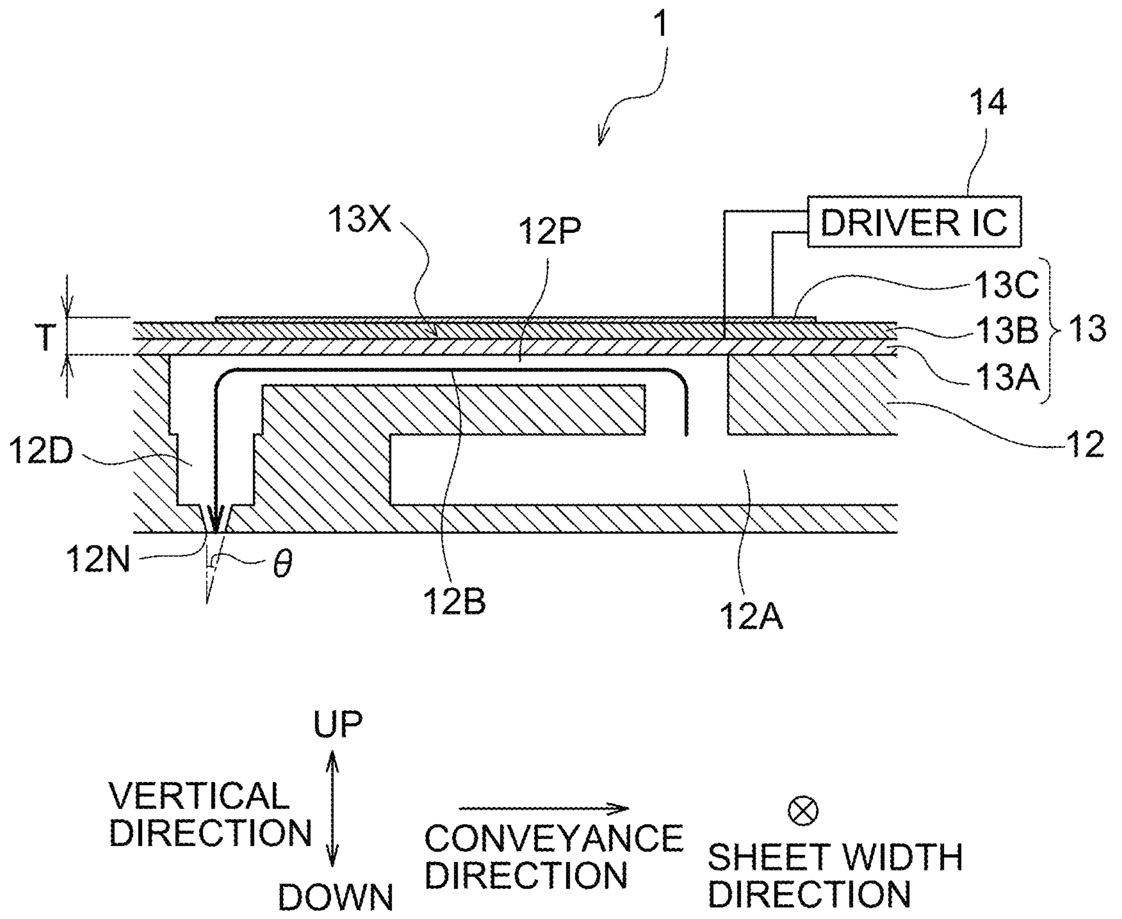
FIG. 4 is a cross-sectional view of the head 1 taken along the line IV-IV in FIG. 3.

As illustrated in FIG. 4, the head 1 includes a channel member 12 and an actuator member 13.

Figure 3:
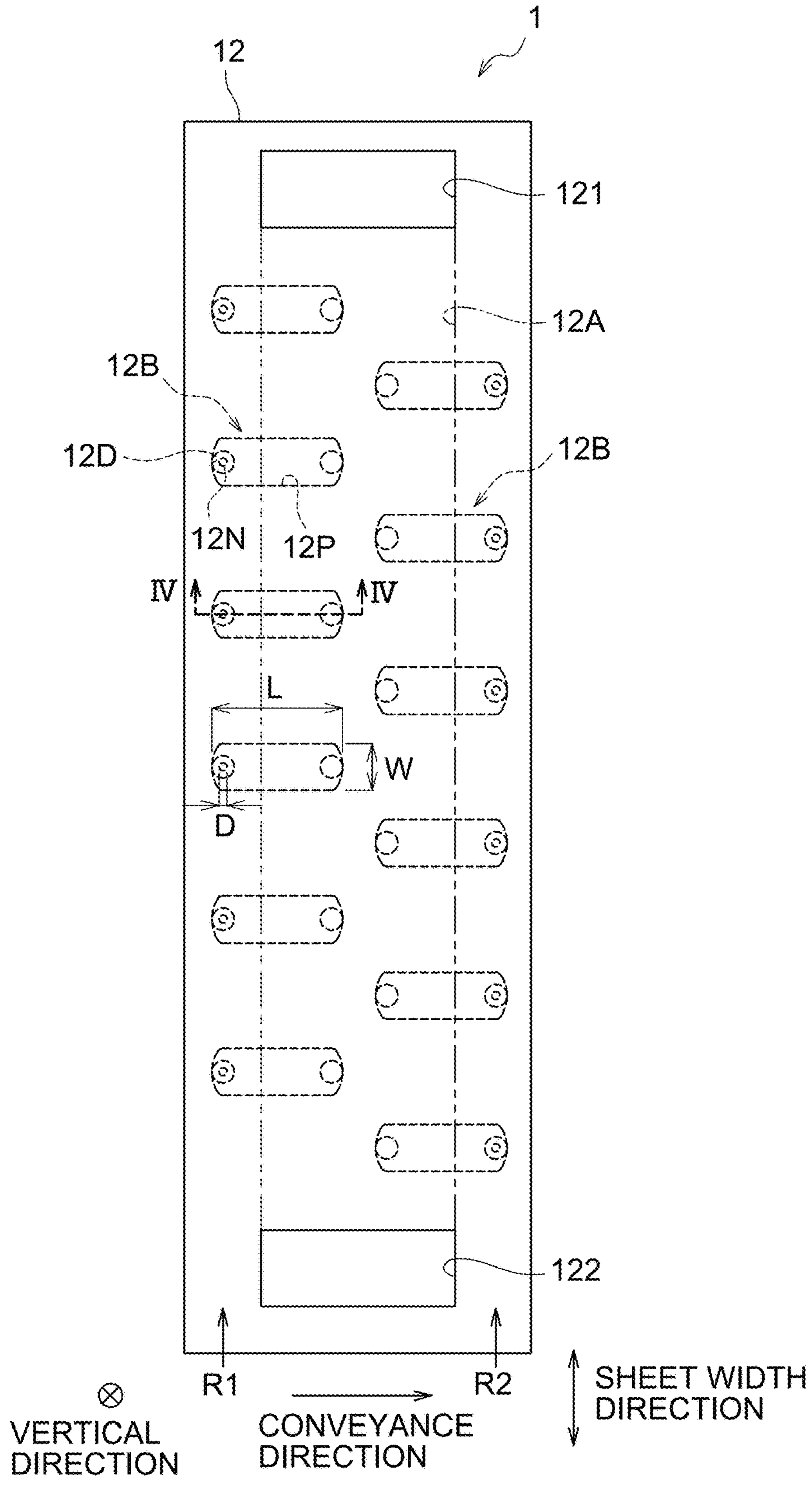
FIG. 3 is a plan view of the head 1.

As illustrated in FIG. 3, the channel member 12 has a supply port 121 and a return port 122, which are opened in its upper surface. The supply port 121 and the return port 122 communicate with an ink tank via a tube.

The channel member 12 has a common channel 12A and individual channels 12B. The common channel 12A and the individual channels 12B are examples of channels in this invention.

The common channel 12A extends in the sheet width direction. The supply port 121 is connected to one end of the common channel 12A in the sheet width direction. The return port 122 is connected to the other end of the common channel 12A in the sheet width direction. The common channel 12A communicates with the ink tank via the supply port 121 and the return port 122, and communicates with the individual channels 12B.

The individual channels 12B each include a nozzle 12N, a pressure chamber 12P that communicates with the nozzle 12N, and a connection channel 12D that connects the nozzle 12N and the pressure chamber 12P. A individual channel 12B corresponds to a "channel" of the present disclosure.

The channel member 12 includes a plurality of plates. The lowermost plate of the plates having the nozzle 12N is a metallic plate. The channel member 12 has a plurality of nozzles 12N, which are opened in a lower surface of the metallic plate, and a plurality of pressure chambers 12P, which are opened in an upper surface of the channel member 12. The nozzles 12N have a circular-shaped opening, and the pressure chambers 12P have a substantially rectangular-shaped opening.

The nozzles 12N of the present embodiment are defined by a metallic member and formed by laser processing or punching processing.

The pressure chamber 12P have a width W that is 300 μm or less, and a length L that is 350 μm or less. The width W is the length in the sheet width direction, and the length L is the length in the conveyance direction. In this embodiment, the width W of the pressure chamber 12P is, for example, 225 μm. The length L of the pressure chamber 12P is, for example, 330 μm.

As illustrated in FIG. 3, the nozzles 12N are located in a staggered manner in the sheet width direction, and constitute two nozzle rows R1 and R2. The nozzle row R1 is constituted by a plurality of nozzles 12N located in the sheet width direction. The nozzle row R2 is constituted by a plurality of nozzles 12N located in the sheet width direction.

As illustrated in FIG. 4, a nozzle 12N has a shape tapered downward. The lower end of the nozzle 12N is an opening of the nozzle 12N. The lower end of the nozzle 12N has a smaller diameter than the upper end of the nozzle 12N. In the present embodiment, a side wall defining the nozzle 12N is inclined with respect to the vertical direction. The nozzle 12N has a taper angle θ that is an acute angle with respect to the vertical direction of the side wall defining the nozzle 12N. The taper angle θ of the nozzle 12N is more than 35° and less than 45°.

As illustrated in FIG. 4, the connection channel 12D connects one end of the pressure chamber 12P in the conveyance direction and the upper end of the nozzle 12N. The connection channel 12D has a cylindrical shape. The diameter of the connection channel 12D is larger than the diameter of the upper end of the nozzle 12N.

When a pump 10 illustrated in FIG. 2 is driven under the control of the controller 5, ink in the ink tank is supplied to the common channel 12A via the supply port 121, and is distributed from the common channel 12A to the individual channels 12B.

When the volume of the pressure chamber 12P is reduced by the driving of the piezoelectric elements 13X, which will be described later, a pressure is applied to the ink in the pressure chamber 12P. A pressurized ink passes through the connection channel 12D and is ejected as an ink droplet from the nozzle 12N.

Ink which is supplied to the common channel 12A via the supply port 121 but is not distributed to the individual channel 12B returns to the ink tank via the return port 122.

As illustrated in FIG. 4, the actuator member 13 is fixed to the upper surface of the channel member 12. The actuator member 13 includes a metallic diaphragm 13A, a piezoelectric layer 13B, and individual electrodes 13C.

Portions of the actuator member 13 that overlap with the respective pressure chamber 12P in the vertical direction function as piezoelectric elements 13X. The piezoelectric elements 13X are each deformable independently of each other in accordance with the potential applied to a corresponding individual electrode 13C.

The piezoelectric elements 13X are each a thin film piezoelectric element. A thickness T of the thin film piezoelectric element is 5 μm or less. In the present embodiment, the thickness T is 3 μm, for example. The thin film piezoelectric element is a so-called micro electromechanical systems (MEMS) device. The piezoelectric elements 13X are made up of a stack of the diaphragm 13A, a thin film serving as the piezoelectric layer 13B on the upper surface of the diaphragm 13A, and a thin film serving as the individual electrodes 13C on the upper surface of the diaphragm 13A.

The diaphragm 13A is disposed on the upper surface of the channel member 12 so as to cover the pressure chambers 12P. The piezoelectric layer 13B is disposed on the upper surface of the diaphragm 13A. The individual electrodes 13C are disposed on the upper surface of the piezoelectric layer 13B such that each of the individual electrodes 13C overlaps a corresponding one of the pressure chambers 12P in the vertical direction.

The diaphragm 13A and the individual electrodes 13C are electrically connected to the driver IC 14. The driver IC 14 changes the potential of the individual electrodes 13C while maintaining the potential of the diaphragm 13A at the ground potential. The diaphragm 13A functions as a common electrode which is an electrode common to the piezoelectric elements 13X.

The driver IC 14 generates a drive signal based on a control signal from the controller 5 and supplies the drive signal to an individual electrode 13C. The drive signal changes the potential of the individual electrode 13C between a predetermined drive potential and the ground potential.

Next, an analysis performed by the inventor of the present application will be described.

Figure 5:
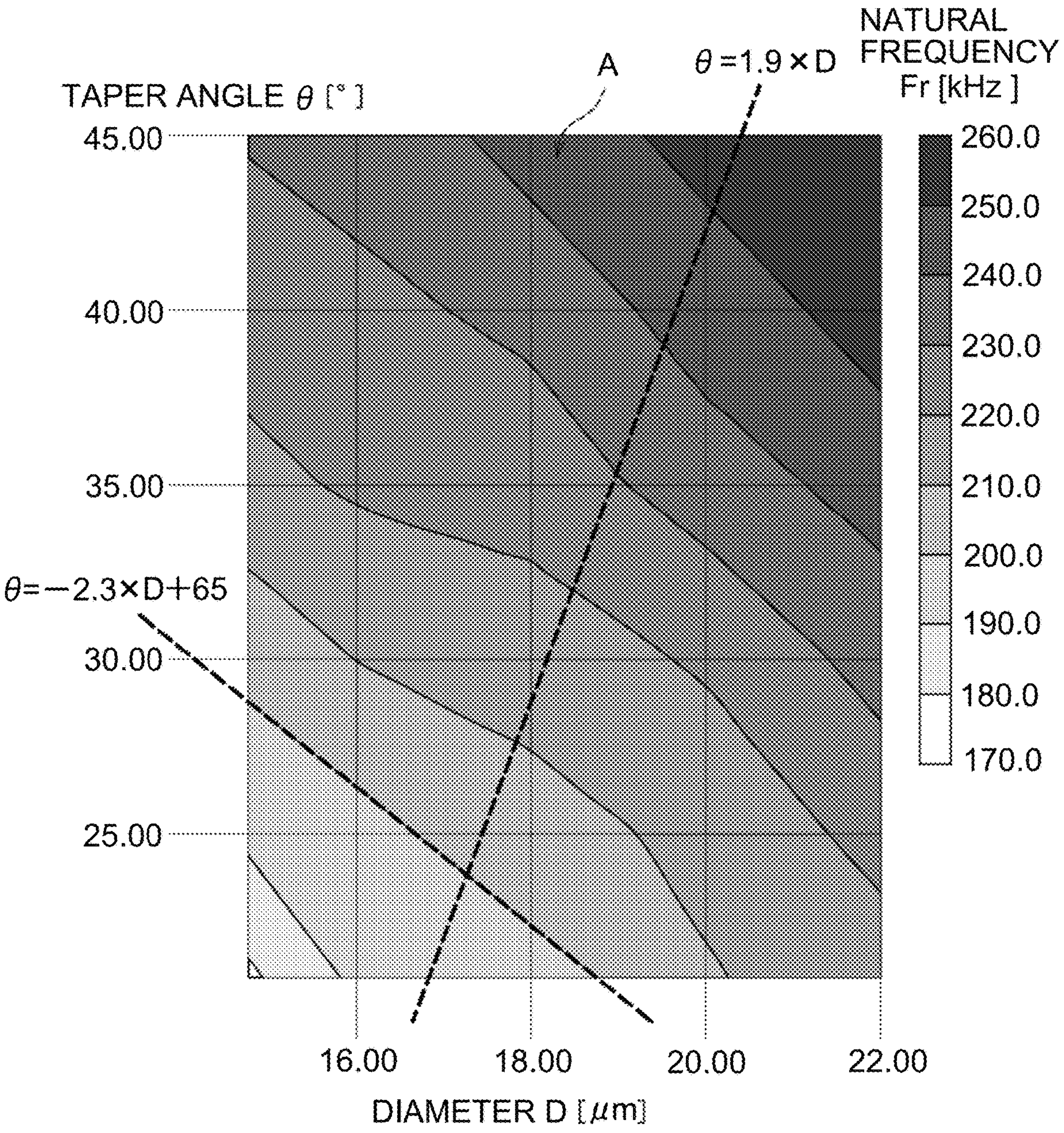
FIG. 5 is a diagram illustrating the relationship between a diameter D of a nozzle and a taper angle θ of the nozzle, and a natural frequency Fr of an individual channel.

The inventor of the present application paid attention to the fact that the diameter D of the opening of the nozzle 12N and the taper angle θ of the nozzle 12N affect the natural frequency Fr of the individual channel 12B, and obtained the natural frequency Fr for a plurality of heads 1 each having a different diameter D and taper angle θ. Here, the configuration of the individual channel 12B other than the diameter D and the taper angle θ is common to the plurality of heads 1. FIG. 5 illustrates a result of analysis performed by the present inventors. It can be seen from FIG. 5 that there is a correlation between the natural frequency Fr, the diameter D, and the taper angle θ.

It can be seen from FIG. 5 that the natural frequency Fr is greater than or equal to or 200 kHz when the diameter D [μm] of the nozzle 12N and the taper angle θ [°] of the nozzle 12N satisfy $\theta \geq -2.3 \times D + 65$. In contrast, in order to drive the head 1 at the driving frequency required by the inventor of the present invention, it is desirable that the natural frequency Fr is greater than or equal to 200 kHz. Since the head 1 of the present embodiment satisfies $\theta \geq -2.3 \times D+65$, the head 1 can be driven at the driving frequency desired by the inventor of the present application.

Further, the inventor of the present application has found the following matters. As the diameter D of the nozzle 12N increases, a higher drive voltage is applied to the piezoelectric element 13X in order to eject a predetermined amount of ink droplet from the nozzle 12N. The smaller the taper angle θ of the nozzle 12N is, the larger the difference in diameter between the connection channel 12D and the upper end of the nozzle 12N is. When the difference is large, the ink flowing through the connection channel 12D receives a great resistance when reaching the upper end of the nozzle 12N. Then, the pressure applied to the ink by the piezoelectric element 13X is attenuated by the resistance, which affects the amount of ink ejected from the nozzle 12N. In order to eject a predetermined amount of ink droplet from the nozzle 12N, the smaller the taper angle θ of the nozzle 12N is, the higher the drive voltage is applied to the piezoelectric element 13X to cancel the influence of attenuation of the pressure. However, it is desirable to avoid applying an excessively high drive voltage to the piezoelectric element 13X. The inventor of the present application has found that, in order to satisfy a requirement that the natural frequency Fr be 200 kHz or more, which is necessary to achieve a desired outcome, and to avoid applying an excessively high drive voltage to the piezoelectric element 13X, it is appropriate that the diameter D [μm] of the nozzle 12N and the taper θ [°] of the nozzle 12N satisfy $\theta > 1.9 \times D$.

A region A satisfying $\theta \geq -2.3 \times D+65$ and $\theta > 1.9 \times D$ is indicated by broken lines in FIG. 5.

As described above, when the head 1 is configured to have nozzles 12N with the diameter D [μm] and the taper angle θ [°] that satisfy $\theta \geq -2.3 \times D+65$, the individual channels 12B have a natural frequency Fr of 200 kHz or more. When the head 1 is configured to have the nozzles 12N with the diameter D [μm] and the taper angle θ [°] that further satisfy $\theta > 1.9 \times D$, even if the piezoelectric elements 13X are driven at a low drive voltage, a sufficient amount of ink is ejected from the nozzle 12N at a high drive frequency.

When a high drive voltage is applied to the piezoelectric element 13X, a heating value of the piezoelectric element 13X increases based on Joule's laws. When heat of the piezoelectric element 13X is transmitted to the ink in the individual channel 12B, the viscosity of the ink decreases. The lower the viscosity of the ink, the larger the volume of the ink droplet ejected from the nozzle 12N. When the volume of the ink droplet ejected from the nozzle 12N is large, the density of the image formed by the ink droplets is high.

In addition, when there are piezoelectric elements 13X which are driven and piezoelectric elements 13X which are not driven, the viscosity of the ink which flows through the individual channels 12B varies. When the viscosity of the ink flowing through the individual channels 12B varies, the volume of the ink droplet ejected from the nozzle 12N of each individual channel 12B also varies, and thus the image quality deteriorates.

In this regard, in the present embodiment, since the drive voltage applied to the piezoelectric elements 13X can be lowered, the Joule heat due to the resistance of the piezoelectric elements 13X is reduced, and the heat generation of the piezoelectric elements 13X is controlled. Since the heat generation of the piezoelectric elements 13X is controlled, the viscosity of the ink does not become lower than a predetermined viscosity, and the viscosity of the ink flowing through the individual channels 12B does not vary. As a result, good image quality is obtained.

In general, as the viscosity of the ink increases, the amount of deformation of the piezoelectric element 13X required for ejecting a predetermined amount of ink droplet from the nozzle 12N increases. In order to increase the amount of deformation of the piezoelectric element 13X, a high drive voltage is generally required to be applied to the piezoelectric element 13X. In this regard, in the present embodiment, as far as the diameter D [μm] of the nozzle 12N and the taper angle θ [°] of the nozzle 12N satisfy $\theta > 1.9 \times D$, the drive voltage applied to the piezoelectric elements 13X for obtaining a predetermined deformation amount of the piezoelectric element 13X may not be required to be so high. Thus, when a high-viscosity ink is used, even if it is necessary to increase the amount of deformation of the piezoelectric element 13X, the drive voltage applied to the piezoelectric element 13X can be low.

Note that, in order to realize that the natural frequency Fr is greater than or equal to 200 kHz and that the drive voltages applied to the piezoelectric elements 13X are low, the width W and the length L of the pressure chamber 12P can be optimized instead of the diameter D and the taper angle θ of the nozzle 12N. However, the width W and the length L of the pressure chamber 12P may be optimized in consideration of both the pressure chamber 12P and the actuator member 13. In this embodiment, the diameter D and the taper angle θ of the nozzle 12N are optimized in consideration of only the nozzle 12N.

When the piezoelectric element 13X is deformed, the shape of the pressure chamber 12P changes. The pressure chamber 12P functions as a damper that absorbs the deformation of the piezoelectric element 13X. The smaller the volume of the pressure chamber 12P is, the greater the rigidity of the channel member 12 constituting the pressure chamber 12P is. The greater the natural frequency Fr of the individual channel 12B is, the greater the rigidity of the channel member 12 is. Here, the piezoelectric element 13X of the present embodiment is a thin film piezoelectric element. The thin film piezoelectric element having a small thickness T is easily deformable, and can be sufficiently deformed even if the pressure chamber 12P is small. Therefore, in a case where the piezoelectric elements 13X are thin film piezoelectric elements, a requirement that the natural frequency Fr be 200 kHz or more can be satisfied by reducing the volume of the pressure chambers 12P to increase the natural frequency Fr. Further, since the thin film piezoelectric elements having a small thickness T are easily deformed, the piezoelectric elements 13X can be sufficiently deformed with a low drive voltage.

The thickness T of the thin film piezoelectric elements is 5 μm or less. When the thickness T of the thin film piezoelectric elements 13X is 5 μm or less, it is possible to more reliably satisfy the requirement that the natural frequency Fr be 200 kHz or more by reducing the volume of the pressure chamber 12P enables to increase the natural frequency Fr and to sufficiently deform the piezoelectric element 13X with a low drive voltage.

The width W of the pressure chamber 12P is 300 μm or less. The smaller the width W of the pressure chamber 12P is, the greater the rigidity of the channel member 12 constituting the pressure chamber 12P is. The greater the natural frequency Fr of the individual channels 12B is, the greater the rigidity of the channel member 12 is. In this embodiment, since the width W of the pressure chamber 12P is as small as 300 μm or less, the requirement that the natural frequency Fr be 200 kHz or more can be more reliably satisfied.

The width L of the pressure chamber 12P is 350 μm or less. The smaller the length L of the pressure chamber 12P is, the higher the rigidity of the channel member 12 constituting the pressure chamber 12P is. The greater the natural frequency Fr of the individual channels 12B is, the greater the rigidity of the channel member 12 is. In this embodiment, since the length L of the pressure chambers 12P is as small as 350 μm or less, the requirement that the natural frequency Fr be 200 kHz or more can be more reliably satisfied.

The taper angle θ is less than 45°. If the taper angle θ is 45° or more, the gradient of the side wall defining the nozzle 12N is too large, so that the meniscus at the opening of the nozzle 12N move toward the upper end of the nozzle 12N, and the meniscus is easily broken. In this regard, in the present embodiment, since the taper angle θ is less than 45°, the meniscus at the opening of the nozzle 12N is less likely to move toward the upper end of the nozzle 12N, and the meniscus is less likely to be broken.

The taper angle θ is greater than 35°. The smaller the taper angle θ is, the larger the difference in diameter between the connection channel 12D and the upper end of the nozzle 12N is. When the difference is large, the ink flowing through the connection channel 12D receives a large resistance when reaching the upper end of the nozzle 12N. Then, the pressure applied to the ink by the piezoelectric element 13X is attenuated by the resistance, which affects the amount of ink ejected from the nozzle 12N. In order to eject a predetermined amount of ink droplet from the nozzle 12N, the smaller the taper angle θ of the nozzle 12N is, the higher drive voltage is applied to the piezoelectric element 13X to cancel the influence of attenuation of the pressure. In this regard, in the present embodiment, since the taper angle θ is greater than 35°, the difference in diameter between the connection channel 12D and the upper end of the nozzle 12N is small. Therefore, the drive voltage applied to the piezoelectric elements 13X can be low.

Second Embodiment

Figure 6:
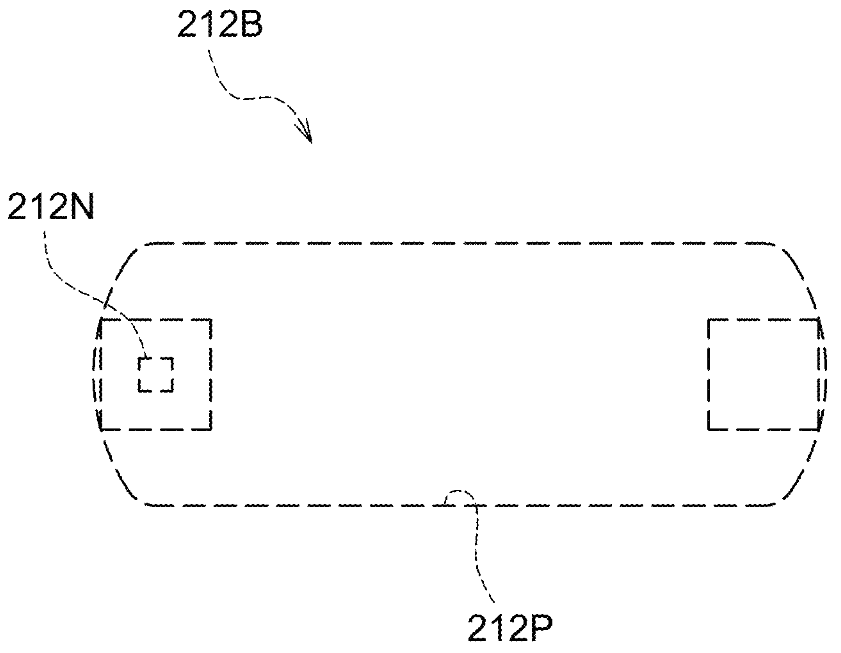
FIG. 6 is a plan view illustrating an individual channel 212B of a head according to a second embodiment of the present disclosure.

In the first embodiment, as illustrated in FIG. 3, the opening of the nozzle 12N is circular. In contrast, in the second embodiment, as illustrated in FIG. 6, the opening of a nozzle 212N has a rectangular shape. When the opening of the nozzle 212N has a rectangular shape as in the second embodiment, because the nozzle 212N does not have a diameter, the nozzle 212N is regarded as having a value D calculated as a diameter of a circle having an area that is the same as an area of the rectangle of the nozzle 212N.

The nozzle 12N of the first embodiment is formed by laser cutting or punching on a metallic member. In contrast, the nozzle 212N of the second embodiment is formed by etching on a silicon member. A pressure chamber 212P is also formed by etching on a silicon member. For example, the channel member includes a plurality of plates. Among the plurality of plates, a plate having the nozzle 212N and the pressure chamber 212P is a silicon plate.

The processing accuracy is higher when forming a nozzle 12N having a circular opening as illustrated in FIG. 3 by laser processing or punching processing than when forming the nozzle 212N having a rectangular opening as illustrated in FIG. 6 by laser processing or punching processing. On the other hand, the processing accuracy is higher when the nozzle 212N having a rectangular opening as illustrated in FIG. 6 is formed by etching than when the nozzle 12N having a circular opening as illustrated in FIG. 3 is formed by etching.

Since the processing accuracy is high, the diameter D of the nozzle 212N can be set to a desired value. In addition, variation in the diameter D among the plurality of nozzle 212N is eliminated.

Etching processing applied to a silicon material enables finer processing than laser processing or punching processing applied to a metal material. Here, in the present embodiment, not only the nozzle 212N but also the pressure chamber 212P is formed by etching on a silicon member. In this case, the volume of the pressure chamber 212P can be reduced by fine processing such as etching. When the volume of the pressure chamber 212P is small, the rigidity of the channel member constituting the pressure chamber 212P is high, and the natural frequency Fr of an individual channel 212B is also high. In addition, the drive voltage can be low by providing an easily deformable thin film piezoelectric element for the pressure chamber 212P having a small volume.

MODIFICATIONS

Although the embodiments of the present disclosure have been described above, the present disclosure is not limited to the above-described embodiments. In the present disclosure, various designs are possible as long as they are described in the scope of claims.

In the above-described embodiments, the electrode constituting the piezoelectric element has a two-layer configuration including the individual electrode and the common electrode, but may have a three-layer configuration. For example, the three-layer configuration is a configuration including a drive electrode to which a high potential and a low potential are selectively applied, a high-potential electrode held at the high potential, and a low-potential electrode held at the low potential.

The type of the liquid droplet ejection head of the present disclosure is not limited to a line type, and may be a serial type.

A target to which the liquid droplets are ejected is not limited to the sheet. Examples of the target includes a cloth, a substrate, and plastic.

The liquid droplets ejected from the nozzle are not limited to ink droplets. Examples of the liquid droplets include droplets of a treatment liquid for aggregation or precipitation of components in an ink.

The present disclosure is not limited to a printer, and is also applicable to a facsimile machine, a copier, and a multifunction peripheral. In addition, the present disclosure can also be applied to a liquid droplet ejecting apparatus used for applications other than image recording. For example, the present disclosure can be applied to a liquid droplet ejecting apparatus that ejects a conductive liquid onto a substrate to form a conductive pattern.

What is claimed is:

1. A liquid droplet ejection head, comprising:

a channel member having a channel, the channel including a nozzle and a pressure chamber communicating with the nozzle; and a piezoelectric element fixed to the channel member and configured to apply a pressure to liquid in the pressure chamber, wherein the channel has a natural frequency Fr of 200 kHz or more, and wherein the nozzle has a diameter D [μm] and a taper angle θ [°] that satisfy $\theta \geq -2.3 \times D + 65$ and $\theta > 1.9 \times D$.

2. The liquid droplet ejection head according to claim 1, wherein the piezoelectric element is a thin film piezoelectric element.

3. The liquid droplet ejection head according to claim 2, wherein the thin film piezoelectric element has a thickness of 5 μm or less.

4. The liquid droplet ejection head according to claim 1, wherein the nozzle is defined by a silicon member and has a rectangular opening.

5. The liquid droplet ejection head according to claim 1, wherein the pressure chamber is defined by a silicon member.

6. The liquid droplet ejection head according to claim 1, wherein the pressure chamber has a width of 300 μm or less.

7. The liquid droplet ejection head according to claim 1, wherein the pressure chamber has a length of 350 μm or less.

8. The liquid droplet ejection head according to claim 1, wherein the taper angle θ is less than 45°.

9. The liquid droplet ejection head according to claim 1, wherein the taper angle θ is greater than 35°.

* * * * *